June 11, 1963  B. BARÉNYI  3,093,406
MOTOR VEHICLE DOOR CONSTRUCTION
Filed May 11, 1959  2 Sheets-Sheet 1
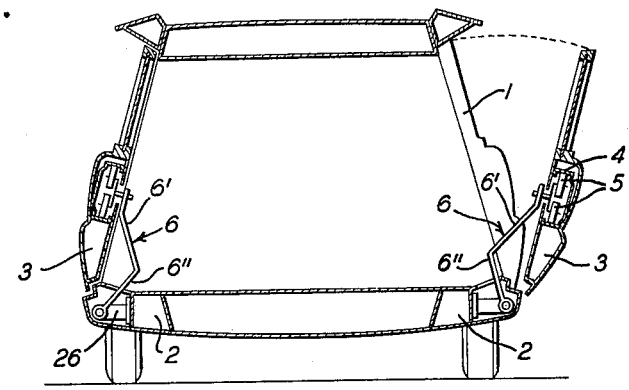
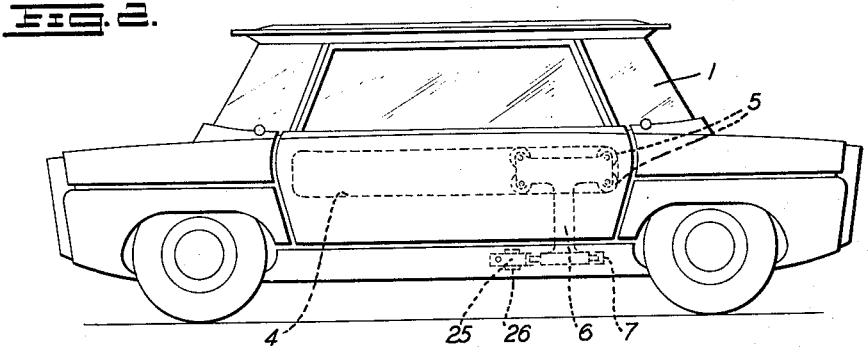
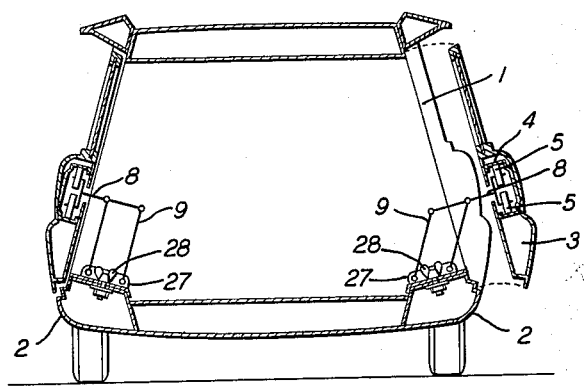
INVENTOR
BÉLA BARÉNYI
BY Dickes, Craig and Freudenberg
ATTORNEYS

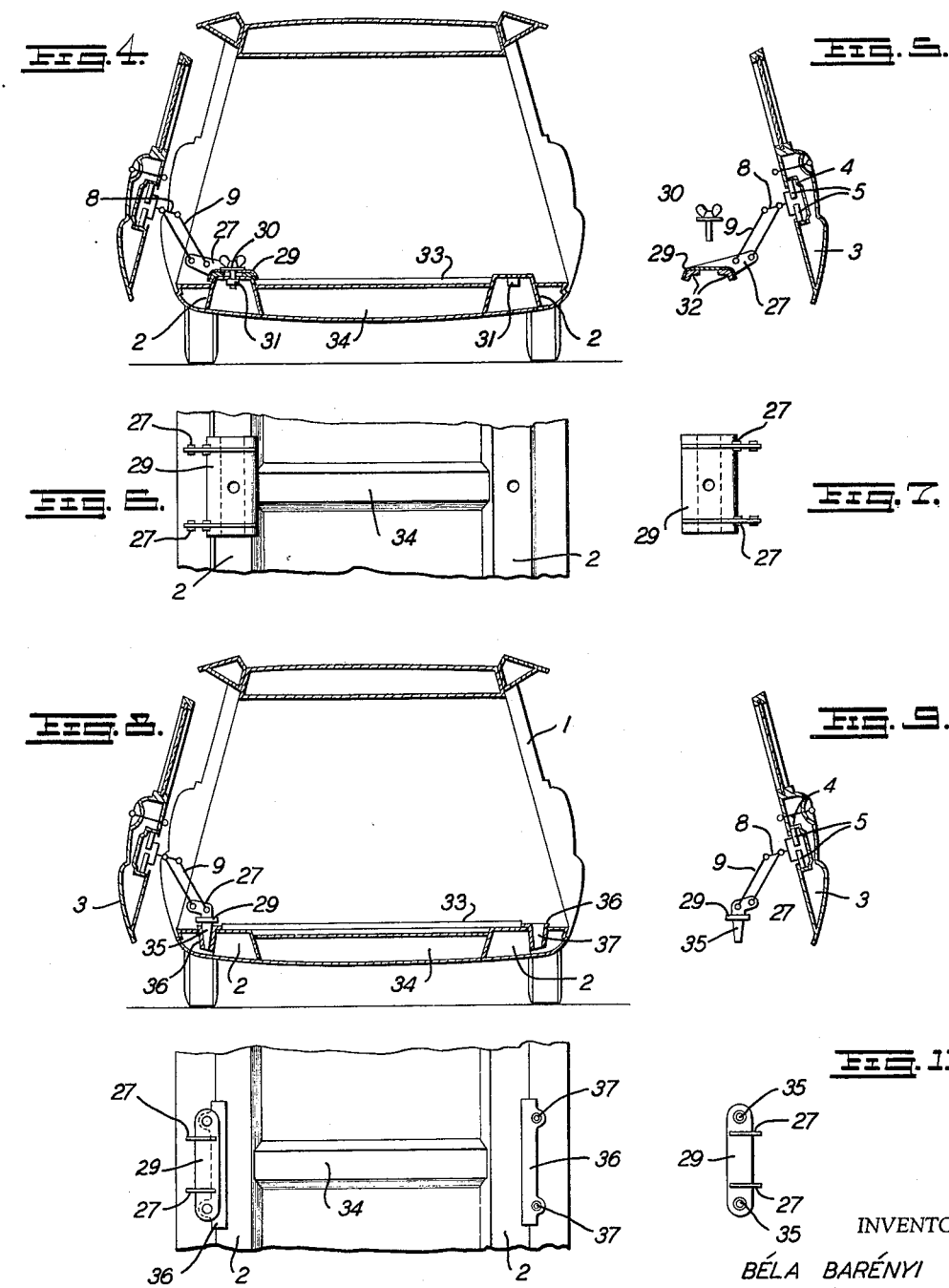

United States Patent Office 3,093,406
Patented June 11, 1963

3,093,406
MOTOR VEHICLE DOOR CONSTRUCTION
Béla Barényi, Stuttgart-Vaihingen, Germany, assignor to Daimler-Benz Aktiengesellschaft, Stuttgart-Unterturkheim, Germany
Filed May 11, 1959, Ser. No. 812,403
Claims priority, application Germany May 13, 1958
7 Claims. (Cl. 296—46)

The present invention relates to a motor-vehicle construction, and more particularly to a slidable motor-vehicle door construction of the type disclosed in my copending application Serial No. 798,882 filed March 12, 1959, and entitled Slidable Door Arrangement in Motor Vehicles, the subject matter of which is incorporated herein by reference insofar as necessary.

My aforementioned copending patent application relates to a slidable door arrangement in which the slidable door is suspended at the frame of the motor vehicle by means of a support installation.

The present invention aims at providing a door suspension of this type for a slidable door in such a manner that the door together with the support means thereof may be readily removed from the frame or superstructure of the motor vehicle appropriately without the aid of or recourse to any tools. This is achieved in accordance with the present invention by mounting the support means or support installation carrying the door in a readily detachable manner on the superstructure such as the body or frame of the motor vehicle. This readily detachable connection between the door support means and the vehicle superstructure may be appropriately so constructed in accordance with the present invention that upon disengagement or removal of the support installation for the door the surface of the vehicle superstructure or framework is devoid of any projections or extensions.

The present invention offers, among others, the advantage that the doors may be readily removed and re-installed during repairs or cleaning of the door so that they do not impair or disturb during work on the vehicle, such as repairs or cleaning operations.

A further advantage which may be achieved by the arrangement in accordance with the present invention consists in the fact that one and the same motor vehicle may be used, with the slidable doors installed, as a closed passenger motor vehicle, and with these slidable doors removed, as an open vehicle, for example, as a hunting vehicle, as a beach vehicle or as a delivery wagon.

In a slidable door arrangement provided with a support arm adapted to be pivoted about an axis disposed in the longitudinal direction of the vehicle, the detachable connection for this support arm in accordance with the present invention may be constructed such that the support arm or support member is supported between a relatively stationary bearing and a bearing adapted to be displaced in the direction of the pivot axis, and, more particularly, this displaceable bearing may be appropriately adapted to be threaded into the bearing support thereof. In order that the bearings of the support arm do not project into the door opening after removal of the support arm, the bearings thereof may be arranged along the outer wall of a longitudinal bearer member of the frame, for example, of the longitudinal sill bearer member.

In a slidable door arrangement provided with a support arrangement having a quadrilateral link system, the detachable connection thereof may be advantageously so constructed that the foot part of the quadrilateral link system rests on a longitudinal bearer member of the frame, for example, on the longitudinal sill bearer member thereof, and is connected with the frame, for instance, by bolt means or clamping devices of any appropriate known construction. The foot part of the quadrilateral link system may thereby be appropriately provided with seating surfaces to facilitate positioning upon the framework, and, more particularly, these seating surfaces may be arranged, for example, in such a manner that the foot part extends or surrounds the longitudinal bearer member on both sides thereof or is inserted into the surface of the longitudinal bearer member. The disengagement of the connection between the foot part and the frame may also appropriately be simplified by the fact that the foot part of the quadrilateral link system is secured at the frame by a single connecting means. To connecting means may thereby consist of a bolt or threaded member provided with a wing nut or with a nut member having an actuating lever or also of a clamping arrangement provided with an eccentric or the like.

A particularly simple and advantageous connection between the foot part of the quadrilateral link system of the support installation and the frame may appropriately consist in accordance with the present invention in that the foot part rests removably in two conically shaped bores of the frame by means of two conical pin members. This type of connection between the support installation and the frame is simply disengaged by lifting the support installation with the door suspended thereat from the frame. The bores for the plug-in type pin members may be arranged either directly in the frame or in a special projection arranged thereat which is appropriately arranged along the outer edge of the longitudinal sill bearer member.

A support surface for the supporting installation provided with a quadrilateral link system which is as wide as possible may be advantageously achieved by providing in the support installation two quadrilateral link systems parallel to each other and by arranging the foot parts thereof at a common floor plate, and more particularly in such a manner that they extend outwardly of the vehicle.

The connection between the support installation provided with a quadrilateral link system and the frame may not only be constructed in a rigid manner but may possibly also be constructed elastically by the provision of elastic intermediate members interposed between the frame and the foot part of the quadrilateral link systems. For example, the elastic intermediate members may be arranged at the underside of the bottom plate of the support arm resting on the longitudinal bearer member or, in case of a connection by means of plug-in type connecting pin members, the bores provided therefore may be provided with an elastic cover or coating made of synthetic material or rubber.

In order to enable the use of a passenger motor vehicle, which is normally provided with a slidable door arrangement in accordance with the present invention, as a hunting or delivery type vehicle, the passenger motor vehicle may be so constructed that at least the rear seats thereof may be readily removed and a false bottom may be inserted in their place between the longitudinal bearer members of the frame. The false bottom may appropriately be limited between abutments of the longitudinal bearer members which may possibly also consist of the projections provided with the bores for the plug-in connecting pin members.

Accordingly, it is an object of the present invention to provide a slidable door arrangement for motor vehicles, which may be readily removed.

Another object of the present invention resides in the provision of a support arrangement for a slidable door which may be readily removed in such a manner as to leave the door aperture completely unobstructed.

Still another object of the present invention resides in the provision of a support arrangement for a slidable door of a motor vehicle which may be readily removed, for example, by merely unscrewing a nut member or by merely lifting the door out of its support while at the same time leaving no projecting parts in the remaining vehicle, particularly in the door aperture thereof.

A further object of the present invention is the provision, in a passenger motor vehicle, of a slidable door arrangement and supoprt therefor which may be readily removed so as to enable a conversion of the passenger motor vehicle into a delivery for hunting-type vehicle without doors.

These and other objects, features and advantages of the present invention will become more obvious from the following description when taken in connection with the accompanying drawing which shows, for purposes of illustration only, several embodiments in accordance with the present invention, and wherein:

FIGURE 1 is a transverse cross-sectional view through a passenger motor vehicle provided with a slidable door arrangement in accordance with the present invention in which the slidable door is suspended from a pivotal support arm and in which the left door is in the normally closed position and the right door in an opening position;

FIGURE 2 is a side view of the slidable door arrangement of FIGURE 1;

FIGURE 3 is a transverse cross-sectional view, similar to FIGURE 1, of a modified embodiment of a slidable door arrangement for a passenger motor vehicle in accordance with the present invention provided with a support member including a quadrilateral link system;

FIGURE 4 is a transverse cross-sectional view through a further modified embodiment of a slidable door arrangement in accordance with the present invention provided with a support arrangement including a quadrilateral link system in which the left door is in an opening position thereof and the right door is removed;

FIGURE 5 is a cross-sectional view through the removed right door of the motor vehicle shown in FIGURE 4 with the door and support assembly thereof removed from the vehicle;

FIGURE 6 is a partial plan view of the central part of the vehicle frame of FIGURE 5;

FIGURE 7 is a plan view of the bottom plate of the support arm assembly used in FIGURES 4, 5 and 6;

FIGURE 8 is a transverse cross-sectional view, similar to FIGURE 4, of still another modified embodiment of a slidable door arrangement in accordance with the present invention provided with a support arm including a quadrilateral link system;

FIGURE 9 is again a cross-sectional view through the removed right-hand door and support assembly of FIGURE 8;

FIGURE 10 is a partial plan view of the central part of the vehicle frame of the vehicle shown in FIGURE 8; and FIGURE 11 is a plan view of the bottom plate of the frame used in connection with the right-hand door assembly of FIGURE 8.

Referring now to the drawing, wherein like reference numerals are used throughout the various views to designate corresponding parts, and more particularly to FIGURES 1 and 2 thereof, reference numeral 1 designates therein a vehicle body of a passenger motor vehicle constructed in any suitable manner and provided with a longitudinal bearer member 2 and a door 3 on each side of the vehicle. In all of the different embodiments of the present application, a guide rail 4 is provided within the door 3 on the inner side thereof, approximately at half the height thereof, while guide members 5, for example, in the form of individual roller or ball members arranged in pairs or groups thereof are adapted to be displaced within the guide rail 4.

In the embodiment of the slidable door arrangement illustrated in FIGURES 1 and 2, one support member or support arm 6 each is pivotally secured at the longitudinal sill bearer member 2 on each side of the vehicle body 1, which support arm 6 has the form of a double-T and may also be angularly shaped as seen from the side thereof, i.e., as seen in FIGURE 1. The term double-T refers to a structure in which two essentially parallel members are interconnected by an intermediate piece which is essentially perpendicular to the other two members. Such a configuration is also known as "I-shaped." The upper essentially transverse leg portion 61 of the support arm 6 thereby carries at the ends thereof the guide members 5. The lower leg portion 6″ of the support arm 6 is pivotally secured, for example, with the right end thereof, as seen in FIGURE 2, in a relatively stationary or rigid bearing 7. The left end of the lower leg portion 6″ of support arm 6, as viewed in FIGURE 2, is supported in the left bearing, which consists of a bearing piece 25 adapted to be displaced in the direction of the pivot axis of the support arm 6, for example, threadably in a bearing support member 26 of any suitable construction. Additionally, resilient intermediate members may be provided between the pivot shaft of the support arm 6, on the one hand, and the bearing 7 as well as the bearing piece 25, on the other.

The bearing piece 25 may be threaded in any suitable manner within the bearing supoprt 26 thereof in the left direction, as viewed in FIGURE 2, to such an extent that the end of the pivot shaft of the support arm 6 is rendered free and the support arm 6 together with the door 3 suspended thereon may be thereby disassembled or removed from the vehicle superstructure 1.

In the embodiment according to the present invention illustrated in FIGURE 3, two T-shaped arms 8 are secured, in a readily detachable manner, by means of a quadrilateral link system 9 each at the longitudinal sill bearer member 2. For that purpose, an abutment flange which may be connected to or integral with plate 29 is provided on both sides of the foot part 27 of the quadrilateral link systems 9 and the abutment flanges are secured at the longitudinal bearer member 2 by means of a pair of bolt members 28 each. The abutment flanges of the foot part 27 may be provided at least along one longitudinal side thereof with an angularly bent portion by means of which they abut against the side wall of the longitudinal bearer member 2 and are thereby positioned thereat.

The embodiment of FIGURES 4-7 in accordance with the present invention distinguishes itself from the embodiment of FIGURE 3 essentially by the fact that two quadrilateral link systems 9 are arranged parallel and adjacent to one another at the T-shaped support arm 8. The foot parts 27 of the quadrilateral link systems 9 rest or are seated on a common bottom plate 29 the longitudinal rim portions of which are angularly bent downwardly appropriately in such a manner that they partially surround the longitudinal bearer member 2 on both sides thereof. The foot parts 27 are so arranged at the bottom plate 29 that they project laterally outwardly of the vehicle so that the outwardly projecting ends thereof come to lie as close as possible along the inner wall of the door 3. The bottom plate 29 which is positioned by reason of its particular shape and contour on top of the longitudinal bearer member 2 is secured only by means of a bolt member 30, the head portion of which is provided, in any suitable manner, with wings or with a lever, and the complementary nut member 31 rigidly secured to the underside of the longitudinal bearer member surface 2. Elastic intermediate members 32 made, for example, of synthetic material or rubber may be arranged along the underside of the bottom plate 29 by means of which the connection between the support arm 8 of the door and the longitudinal bearer member 2 is rendered elastic.

As may be readily seen from FIGURE 4, the surface of the longitudinal bearer member 2 is completely plain and unobstructed and rendered completely free from any disturbing projections after the removal of the assembly consisting of the door and support arrangement thereof. After the removal of the rear seat (not illustrated) which may be constructed in any suitable manner so as to be readily removable, a false bottom 33 may be inserted between the two longitudinal bearer members 2 which, for example, may rest on a cross bearer member 34 of the vehicle frame. The false bottom 33 may thereby appropriately be so dimensioned that it abuts with the lateral edge portions thereof along the two longitudinal bearer members 2 and that the surface of the bottom 33 is essentially coplanar with the surface of the longitudinal bearer members 2.

The embodiment of a slidable door arrangement in accordance with the present invention illustrated in FIGURES 8–11 distinguishes itself by its particularly simple connection of the support arrangement for the slidable door 3 with the frame of the motor vehicle. The connection according to FIGURES 8–11 consists essentially of two conically shaped plug members 35 which are arranged along the underside of the bottom plate 29 and are adapted to be inserted into corresponding complementary bores provided in the frame of the vehicle. For that purpose, an extension or projection 36 provided with two conical bores 37 is arranged, in the embodiment illustrated in FIGURES 8–11, at the longitudinal bearer member 2 along the outer upper edge portion thereof whereby the bores 37 may possibly be provided with a coating or lining made of elastic material, for example, of synthetic material or rubber. In the embodiment of FIGURES 8–11, no additional connecting means are necessary between the support arrangement of the door 3 and the frame of the motor vehicle. The plug-in-type pin members 35, on the one hand, are seated securely and reliably in bores 37 by reason of the wedging or clamping effect due to the load of the door 3, and, on the other, the door 3 together with the support arrangement thereof may be readily removed by the fact that, after opening of the door 3, the latter is lifted and thereby the pin members are pulled out of the bores 37.

As in the previous embodiment, a false bottom 33 may be provided also in the embodiment according to the present invention illustrated in FIGURES 8–11 after removal of the rear seats, by inserting a floor bottom 33 which may possibly rest on the longitudinal bearer members 2 and is safely retained in its installed position by the fact that it abuts with the outer, lateral edge portions at the inner edge portions of extensions 36.

While I have shown and described only several preferred embodiments in accordance with the present invention, it is understood that the same is not limited thereto but is susceptible of many changes and modifications within the spirit and scope of the present invention and I, therefore, do not wish to be limited to the details illustrated and described herein but intend to cover all such changes and modifications thereof as are encompassed by the scope of the appended claims.

I claim:

1. A slidable door arrangement, especially for passenger motor vehicles having a vehicle body provided with at least one door aperture and a fixed vehicle part positioned below said door aperture, a sliding door normally closing said door aperture, support means for supporting said door in an open position consisting essentially exclusively of a single support arm assembly having an upper end and a lower end, said support arm assembly having means including link members interconnected to form a quadrilateral, essentially longitudinal pivot means to pivotably secure said lower end of said support arm assembly to said fixed vehicle part to enable first movement of said door from a closed position thereof in the transverse direction of the vehicle away from said door aperture, guide means connected to said upper end of said support arm assembly and pivotable therewith, and complementary guide means secured to the inside of said door and cooperating with said first-mentioned guide means to enable a second movement of said door essentially in the longitudinal direction of the vehicle, the above-enumerated support means being positioned within the interior of said vehicle body in the closed position of said door.

2. A slidable door arrangement, especially for passenger motor vehicles according to claim 1, wherein said support arm assembly includes additional means including additional link members forming a second quadrilateral disposed essentially parallel to the first-mentioned quadrilateral.

3. A slidable door arrangement, especially for passenger motor vehicles having a vehicle body provided with at least one door aperture and a fixed vehicle part positioned below said door aperture, a sliding door normally closing said door aperture, support means for supporting said door in an open position consisting essentially exclusively of a single support arm assembly having an upper end and a lower end, said support arm assembly having means including link members interconnected to form a quadrilateral, essentially longitudinal pivot means to pivotably secure said lower end of said support arm assembly to said fixed vehicle part to enable first movement of said door from a closed position thereof in the transverse direction of the vehicle away from said door aperture, guide means connected to said upper end of said support arm assembly and pivotable therewith, complementary guide means secured to the inside of said door and cooperating with said first-mentioned guide means to enable a second movement of said door essentially in the longitudinal direction of the vehicle, the above-enumerated support means being positioned within the interior of said vehicle body in the closed position of said door, and connecting means for readily detachably connecting said support arm assembly at said fixed vehicle part to enable complete removal of said door and said support means from the vehicle.

4. A slidable door arrangement, especially for passenger motor vehicles according to claim 3, wherein said connecting means includes a foot part at least partially surrounding said frame bearer member on both sides thereof.

5. A slidable door arrangement, especially for passenger motor vehicles according to claim 3, wherein said fixed vehicle part is a frame bearer member provided with a recess, and wherein said connecting means includes a foot part which has a lower part emplaced into said recess.

6. A slidable door arrangement, especially for passenger motor vehicles according to claim 3, wherein said fixed vehicle part is a frame bearer member provided with two conical bores, and wherein said connecting means include two conically shaped pin members adapted to be placed into said conical bores.

7. A slidable door arrangement, especially for passenger motor vehicles according to claim 3, wherein said fixed vehicle part is a frame bearer member, and wherein said connecting means for readily detachably connecting said foot part at said frame bearer member includes complementary plug and bore means arranged at said frame bearer member, and wherein said bore means are provided with an elastic lining.

References Cited in the file of this patent

UNITED STATES PATENTS

| 1,813,553 | Van Dorn | July 7, 1931 |
| 2,839,331 | Smith | June 17, 1958 |
| 2,956,836 | James | Oct. 18, 1960 |

FOREIGN PATENTS

| 698,436 | France | Nov. 18, 1930 |
| 717,071 | France | Oct. 13, 1931 |